(12) United States Patent
Park et al.

(10) Patent No.: US 6,246,715 B1
(45) Date of Patent: Jun. 12, 2001

(54) DATA TRANSMITTER AND RECEIVER OF A DS-CDMA COMMUNICATION SYSTEM

(75) Inventors: Jong-Hyeon Park, Seoul; Je-Woo Kim, Suwon-shi, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/105,219

(22) Filed: Jun. 26, 1998

(51) Int. Cl.[7] .............................. H04B 15/00; H04K 1/00; H04L 27/30
(52) U.S. Cl. .......................................... 375/146; 375/141
(58) Field of Search ..................................... 375/135, 146, 375/133, 141, 130, 132, 140; 370/335, 320, 342, 441

(56) References Cited

U.S. PATENT DOCUMENTS

| | | |
|---|---|---|
| 4,956,837 | 9/1990 | Vollmer . |
| 4,985,900 | 1/1991 | Rhind et al. . |
| 5,341,395 | 8/1994 | Bi . |
| 5,361,276 | 11/1994 | Suramanian . |
| 5,377,225 | 12/1994 | Davis . |
| 5,400,359 | 3/1995 | Hikoso et al. . |
| 5,414,728 | 5/1995 | Zehavi . |
| 5,416,797 | 5/1995 | Gilhousen et al. . |
| 5,546,420 | 8/1996 | Seshadri et al. . |
| 5,550,810 | 8/1996 | Monogioudis et al. . |
| 5,583,853 | 12/1996 | Giallorenzi et al. . |
| 5,596,600 | 1/1997 | Dimos et al. . |
| 5,646,964 | 7/1997 | Ushirokawa et al. . |
| 5,675,608 | 10/1997 | Kim et al. . |
| 5,694,388 | 12/1997 | Sawahashi et al. . |
| 5,712,869 | 1/1998 | Lee et al. . |
| 5,734,647 | 3/1998 | Yoshida et al. . |
| 5,737,327 | 4/1998 | Ling et al. . |
| 5,956,373 | * 9/1999 | Goldston et al. ..................... 375/298 |

* cited by examiner

Primary Examiner—Chi Pham
Assistant Examiner—Phuong Phu
(74) Attorney, Agent, or Firm—Robert E. Bushnell, Esq.

(57) ABSTRACT

A data transmitter and receiver in a DS-CDMA communication system designed to prevent a serious amplitude shift in a transmission signal, facilitate recovery of data and clock signals and relieve the constraint of using a high linearity, high performance amplifier. The data transmitter includes a spread signal generating device, in which I-arm and Q-arm information signals of the first channel are spread by I-arm and Q-arm PN codes, respectively, and I-arm and Q-arm information signals of a predetermined number of following channels are spread by an inverted Q-arm PN code and the I-arm PN code, respectively. The data receiver includes a despread signal generating device, in which an I-arm despread signal is generated by multiplying I-arm and Q-arm digital baseband spread signals by I-arm and Q-arm PN codes, respectively, and adding the multiplication results, while a Q-arm despread signal is generated by multiplying Q-arm and I-arm digital baseband spread signal by an inverted I-arm PN code and the Q-arm PN code, respectively, and adding the multiplication results.

18 Claims, 6 Drawing Sheets

DATA TRANSMITTER AND RECEIVER OF A DS-CDMA COMMUNICATION SYSTEM

BACKGROUND OF THE INVENTION

1. Technical Field

The present invention relates to a direct-sequence CDMA (Code Division Multiple Access) (DS-CDMA) communication system, and in particular, to a data transmitter and receiver of a DS-CDMA communication system, which prevent on-off or serious amplitude shift of a transmission signal and facilitate recovery of data and clock signals.

2. Related Art

Spread spectrum communication is described in many publicly available documents, such as Spread Spectrum Communications by Marvin K. Simon et al. (Computer Science Press, 1989), Spread Spectrum Communications Handbook by Marvin K. Simon et al. (McGraw-Hill, 1994), Spread Spectrum System With Commercial Applications by Robert C. Dixon (John Wiley & Sons, 1994), U.S. Pat. No. 5,431,395 for Data Recovery Technique For Asynchronous CDMA Systems issued to Bi, U.S. Pat. No. 5,361,276 for All Digital Maximum Likelihood Based Spread Spectrum Receiver issued to Subramanian, U.S. Pat. No. 5,400,359 for Spread Spectrum Communication System And An Apparatus For Communication Utilizing This System issued to Hikoso et al., U.S. Pat. No. 5,414,728 for Method And Apparatus For Bifurcating Signal Transmission Over In-Phase And Quadrature Phase Spread Spectrum Communication Channels issued to Zehavi, U.S. Pat. No. 5,416,797 for System And Method For Generating Signal Waveforms In A CDMA Cellular Telephone System issued to Gilhousen et al., U.S. Pat. No. 5,546,420 for Methods Of And Devices For Enhancing Communications That Use Spread Spectrum Technology By Using Variable Code Techniques issued to Seshadri et al., U.S. Pat. No. 5,550,810 for Direct Sequence Code Division Multiple Access (DS-CDMA) Communication System And A Receiver For Use In Such A System issued to Monogioudis et al., U.S. Pat. No. 5,583,835 for Synchronous CDMA Transmitter/Receiver issued to Giallorenzi et al., U.S. Pat. No. 5,596,600 for Standalone Canceller Of Narrow Band Interference For Spread Spectrum Receiver issued to Dimos et al., U.S. Pat. No. 5,646,964 for DS/CDMA Receiver For High-Speed Fading Environment issued to Ushirokawa et al., U.S. Pat. No. 5,694,388 for CDMA Demodulator And Demodulation Method issued to Sawahashi et al., and U.S. Pat. No. 5,734,647 for CDMA Communication System In Which Interference Removing Capability is Improved issued to Yoshida et al. As is well known, spread spectrum signals are used for (i) combating interference, (ii) transmitting at very low power to avoid detection/interception, and (iii) multiplexing one channel over many users. Spread spectrum signal processing is characterized by expanding the bandwidth of a message signal, transmitting the expanded signal, and recovering the message signal by remapping the spread spectrum into the original bandwidth. The method of spread spectrum communication includes direct sequence, frequency hopping, time hopping and a hybrid combing two or more of these. Direct sequence spreads the spectrum by multiplying data and the pseudo-random noise (PN) code having a chip rate considerably higher than data rate, of which circuitry can be implemented relatively easily as compared with those used in other methods. Use of different PN codes allows multiple access in the same frequency band. Such multiple access is called Code Division Multiple Access (CDMA) or Spread Spectrum Multiple Access (SSMA).

A radio communication system using direct sequence spread spectrum is commonly known as a Direct Sequence Code Division Multiple Access (DS-CDMA) systems, according to TIA/EIA standard IS-95. Individual users in the system use the same radio frequency (RF) but are separated by the use of individual spreading code. In a spread spectrum communication system, downlink transmissions include a pilot channel and a plurality of user traffic channels. The pilot channel is coded by all users. Each traffic channel is intended for decoding by a single user. Therefore, each traffic channel is encoded using a code known by both the base station and mobile station. The pilot channel is encoded using a code known by the base station and all mobile stations. The pilot channel is used to provide timing and carrier phase synchronization in the receiver of a mobile station, and estimation of the gain of the channel and the phase shift imposed by the channel.

Exemplars of a data transmitter and receiver in a DS-CDMA communication system using a pilot channel and a plurality of user traffic channels are disclosed in Korea Application No. 94-20801 for Data Transceiver in Spread Spectrum Communication System Using Pilot Channel and Korea Application No. 94-30497 for Data Transceiver in Spread Spectrum Multiple Access Communication System Using Pilot Channel, U.S. Pat. No. 5,675,608 for Synchronous Transmitter And Receiver Of Spread Spectrum Communication Method issued to Kim et al., U.S. Pat. No. 5,712,869 for Data Transmitter And Receiver Of A Spread Spectrum Communication System Using A Pilot Channel issued to Lee et al, all are assigned to the instant assignee and incorporated by reference herein. Based upon our studies of many contemporary data transmitters and receivers of a DS-CDMA communication system using a pilot channel, we have observed that the receiver often incorrectly determines that a spread spectrum signal is on/off due to the simultaneous zero crossing of an in-phase (I) and quadrature-phase (Q) channel data. As a result, recovery of data and clock signal has been entirely satisfactory.

SUMMARY OF THE INVENTION

Accordingly, it is therefore an object of the present invention to provide a data transmitter and receiver in a DS-CDMA communication system, which prevent on-off of a transmission signal.

It is also an object of the present invention to provide a data transmitter and receiver in a DS-CDMA system, which prevent I-arm and Q-arm channel data from being zeroes simultaneously.

It is further an object of the present invention to provide a data transmitter and receiver in a DS-CDMA communication system, which facilitate recovery of data and a clock signal.

It is another object of the present invention to provide a data transmitter and receiver in a DS-CDMA communication system, which prevent a serious amplitude shift in a transmission signal.

It is still another object of the present invention to provide a data transmitter and receiver in a DS-CDMA communication system, which relieves the constraint of using a high linearity, high performance amplifier.

It is yet another object of the present invention to provide a spread signal generating device and a despread signal generating device in a DS-CDMA communication system, which prevent on-off of a signal or a serious amplitude shift, and facilitate recovery of data and a clock signal.

These and other objects of the present invention can be achieved by a data transmitter in a DS-CDMA communication system which includes a spread signal generating device, in which I-arm and Q-arm information signals of the first channel are spread by I-arm and Q-arm PN codes, respectively, and I-arm and Q-arm information signals of a predetermined number of following channels are spread by an inverted Q-arm PN code and the I-arm PN code, respectively. A data receiver includes a despread signal generating device, in which an I-arm despread signal is generated by multiplying I-arm and Q-arm digital baseband spread signals by I-arm and Q-arm PN codes, respectively, and adding the multiplication results, while a Q-arm despread signal is generated by multiplying Q-arm and I-arm digital baseband spread signal by an inverted I-arm PN code and the Q-arm PN code, respectively, and adding the multiplication results.

A spread signal generating device in a DS-CDMA communication system is implemented to transmit an information signal through a plurality of channels. In the spread signal generating device, a first PN code generator generates an I-arm PN code and a second PN code generator generates a Q-arm PN code. An inverter inverts the Q-arm PN code and outputs an inverted Q-arm PN code. A first multiplier multiplies the I-arm PN code by an information signal of the first channel among the plurality of channels, a second multiplier multiplies the Q-arm PN code by the information signal of the first channel, a first group of multipliers multiply the inverted Q-arm PN code by information signals of the other channels, respectively, and a second group of multipliers multiply the I-arm PN code by the information signals of the other channels. A first adder adds the multiplication results of the first multiplier and the first group of multipliers and outputs the adding result as an I-arm spread signal, and a second adder adds the multiplication results of the second multiplier and the second group of multipliers and outputs the adding result as a Q-arm spread signal.

A despread signal generating device in a DS-CDMA communication system is implemented to receive an information signal through a plurality of channels. In the despread signal generating device, a first PN code generator generates an I-arm PN code and a second PN code generator generates a Q-arm PN code. An inverter inverts the I-arm PN code and outputs an inverted I-arm PN code. A first multiplier multiplies the I-arm PN code by an I-arm digital baseband spread signal, a second multiplier multiplies the inverted I-arm PN code by a Q-arm digital baseband spread signal, a third multiplier multiplies the inverted I-arm PN code by the Q-arm baseband spread signal, and a fourth multiplier multiples the Q-arm PN code by the I-arm baseband spread signal. A first adder adds the multiplication results of the first multiplier and the third multiplier and outputs the adding result as an I-arm despread signal, and a second adder adds the multiplication results of the second multiplier and the fourth multiplier and outputs the adding result as a Q-arm despread signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
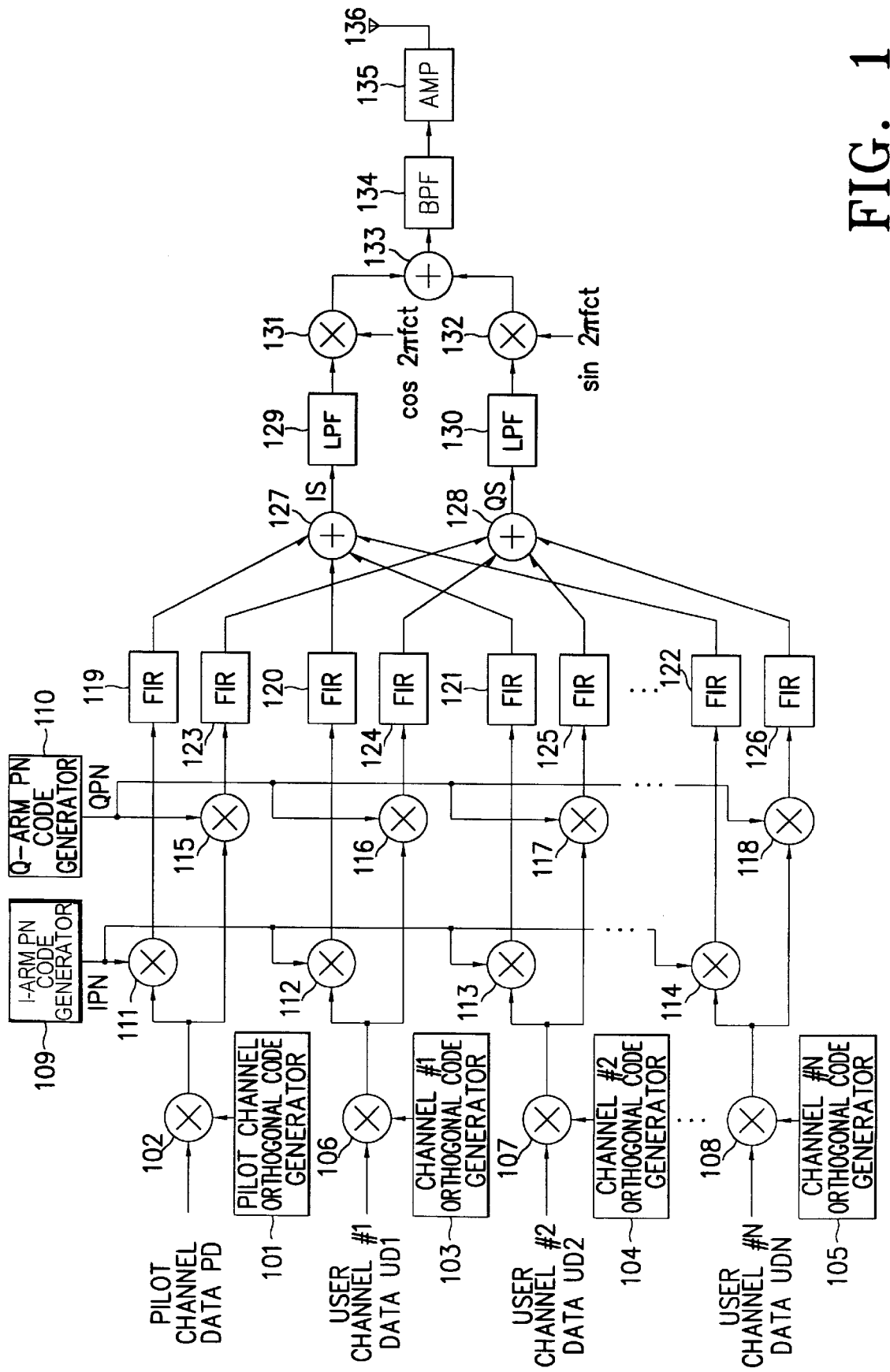
FIG. 1 is a block diagram of a typical data transmitter in a DS-CDMA communication system.

Referring now to the drawings and particularly to FIG. 1, which illustrates a typical data transmitter in a DS-CDMA communication system utilizing a pilot channel. A transmission signal includes pilot channel data PD and a plurality of user channel data UD1 to UDN. The pilot channel data PD, all generally transmitted as "1", allows a data receiver to ensure pseudo-noise (PN) synchronization or serves as a reference synchronization signal for data demodulation. The user channel data UD1 to UDN is information data to be actually transmitted. Thus, the data receiver corresponding to the data transmitter selects one of N user channels and demodulates received data. The pilot channel data PD is multiplied by an output of a pilot channel orthogonal code generator 101 in a multiplier 102, and the user channel data UD1 to UDN is multiplied by outputs of their corresponding user channel orthogonal code generators 103 to 105 in multipliers 106 to 108. The pilot channel orthogonal code generator 101 and the user channel orthogonal code generators 103 to 105 generate different orthogonal codes, to thereby distinguish channels from one another.

Each of the outputs of the channel multipliers 102, 106, 107, and 108 is divided into I-arm data and Q-arm data. I-arm multipliers 111 to 114 multiply the I-arm data received from the multipliers 102, 106, 107, and 108 by an output IPN of an I-arm PN code generator 109 and output spread signals. Q-arm multipliers 115 to 118 multiply the Q-arm data received from the multipliers 102, 106, 107, and 108 by an output QPN of a Q-arm PN code generator 110 and output spread signals. The outputs of the I-arm multipliers 111 to 114 are filtered by FIR (Finite Impulse Response) filters 119 to 122, while those of the Q-arm multipliers 115 to 118 are filtered by FIR filters 123 to 126. Adders 127 and 128 add the outputs of the I-arm FIR filters 119 to 122 and the Q-arm FIR filters 123 to 126, respectively, resulting in an I-arm signal IS and a Q-arm signal QS.

The outputs IS and QS of the I-arm and Q-arm adders 127 and 128 are low-pass filtered in low-pass filters (LPFs) 129 and 130 and applied to multipliers 131 and 132, respectively. The multiplier 131 multiplies the output of the LPF 129 by an in-phase component, $\cos(2\pi fct)$ of a carrier, whereas the multiplier 132 multiplies the output of the LPF 130 by a quadrature-phase component, $\sin(2\pi fct)$. Then, the outputs of the multipliers 131 and 132 are added by an adder 133, band-pass filtered by a band pass filter (BPF) 134, amplified in an amplifier (AMP) 135, and transmitted via an antenna 136.

In the contemporary DS-CDMA technology, the input data of every channel is spread by the I-arm PN code IPN and the Q-arm PN code QPN for transmission. In this situation, spreading of the input data involves multiplying the input data by the I-arm and Q-arm PN codes IPN and QPN, respectively, in the I-arm multipliers 111 to 114 and the Q-arm multipliers 115 to 118. It is noted, however, that the outputs of the adders 127 and 128, that is, the I-arm and Q-arm channel data can be zeroes simultaneously depending on the input data and the I-arm and Q-arm PN codes IPN, and QPN. In this case, the outputs of the multipliers 131 and 132 are in turn zeroes simultaneously, and the output of the adder 133 to be transmitted via the antenna 136 becomes zero. When the outputs of the adders 127 and 128 become zeroes simultaneously, the receiver can incorrectly determine that a signal is on/off and recover data and a clock signal in this abnormal state, thereby resulting in difficulty to recover data and a clock signal in a steady state.

We have observed that the problem of the adders 127 and 128 outputting zeroes simultaneously can be overcome by controlling the gain of each channel, but to lower the amplitudes of the outputs of the adders 127 and 128. Then, a serious amplitude shift takes place between the outputs of the adders 127 and 128 having low amplitudes and the outputs thereof during actual data transmission, leading to amplitude shift keying in the system. To prevent this amplitude shift keying, a high linearity, high performance amplifier should be used as the AMP 135 between the BPF 134 and the antenna 136.

Figure 2:
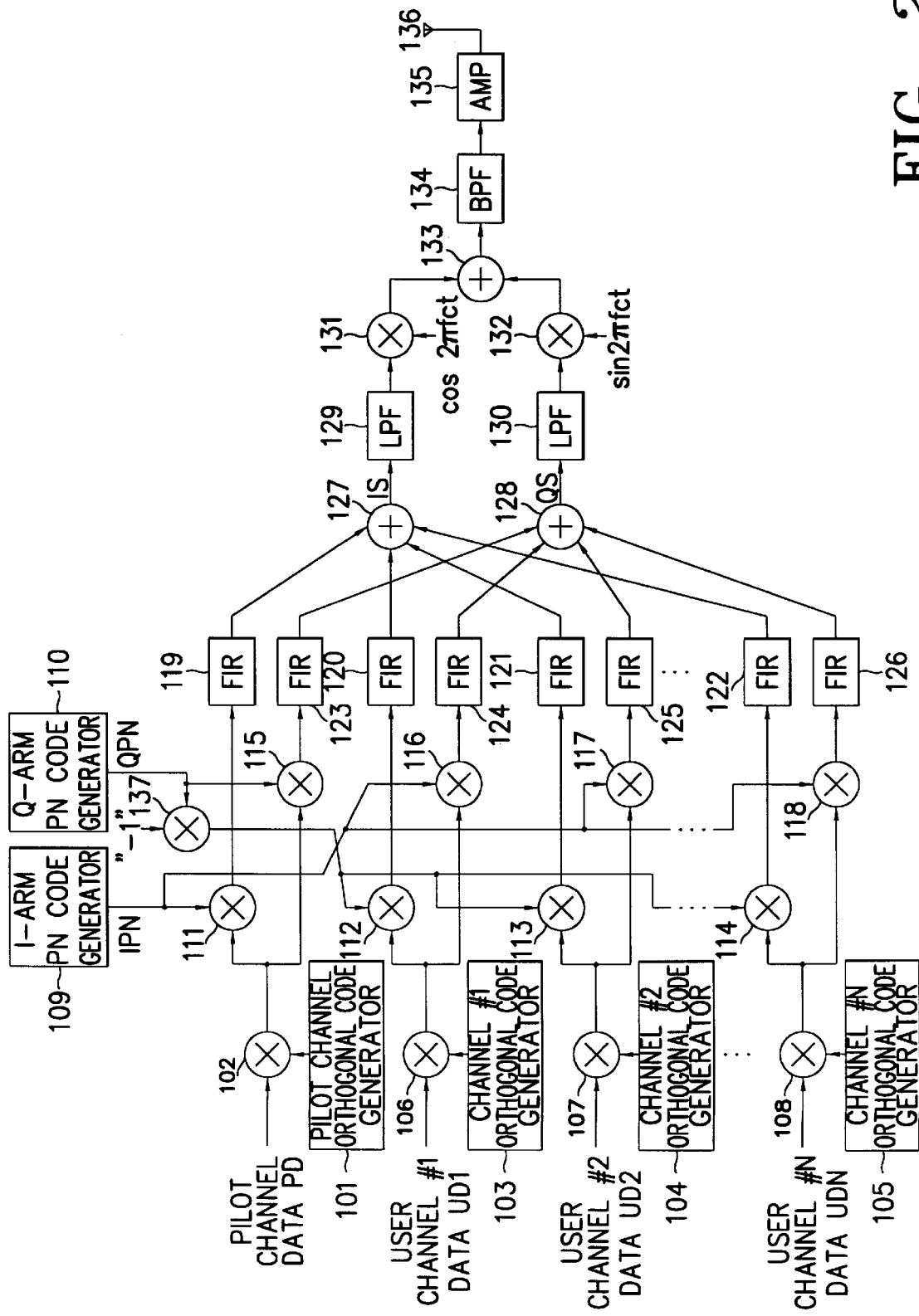
FIG. 2 is a block diagram of a data transmitter in a DS-CDMA communication system constructed according to a preferred embodiment of the present invention.

Turning now to FIG. 2 which illustrates a data transmitter of a DS-CDMA communication system constructed according to a preferred embodiment of the present invention. Referring to FIG. 2, a transmission signal mainly includes the pilot channel data PD and the user channel data UD1 to UDN. The pilot channel data PD, all transmitted as "1", allows the data receiver to ensure PN synchronization or perform PN tracking, or serves as a reference synchronization signal for data demodulation. The user channel (traffic channel) data UD1 to UDN are information data to be actually transmitted. Though the number of the user channels is shown to be N in the drawing, it can be changed according to the specification of a system. A receiver corresponding to the transmitter of FIG. 2 selects one of the N user channels and demodulates the data of the selected channel. The pilot channel data PD is multiplied by the output of the orthogonal code generator 101 in the multiplier 102. The user channel data UD1 to UDN are multiplied by the outputs of their respective orthogonal code generators 103 to 105 in the multipliers 106 to 108. A signal output from the multiplier 102 is an orthogonal code signal of the pilot channel data PD, while signals output from the multipliers 106 to 108 are orthogonal code signals of the user channel data UD1 to UDN. Here, the orthogonal codes are different, orthogonal to one another, and may be a Walsh code. Thus, the channels can be differentiated or separated from one another. The orthogonal code signals output from the multipliers 102 to 108 are separated into I-arm data and Q-arm data and provided to multipliers 111 to 118 in the next stage.

The data transmitter of the DS-CDMA communication system constructed according to the preferred embodiment of the present invention operates in the same manner as the conventional transmitter except for the mechanism of spreading the orthogonal code data of each channel by use of the PN codes IPN and QPN, as described hereinbelow.

Spreading of the I-arm data output from the pilot channel multiplier 102 involves multiplying the I-arm data by the output IPN of the I-arm PN code generator 109 in the multiplier 111, while spreading of the Q-arm data thereof involves multiplying the Q-arm data by the output QPN of the Q-arm PN code generator 110 in the multiplier 115. On the other hand, PN spreading of the user channel signal is different from that of the pilot channel signal. The I-arm outputs of the user channel multipliers 106 to 108 are spread by multiplying the I-arm data by an inverted Q-arm PN code, resulting from multiplication of the Q-arm PN code QPN by "−1", in a multiplier 137, while the Q-arm outputs thereof are spread by the output IPN of the I-arm PN code generator 109. That is, a first group of I-arm multipliers 112 to 114 multiply the outputs of the multipliers 106 to 108 by the inverted QPN to output spread channel data, and a second group of Q-arm multipliers 116 to 118 multiply the outputs of the multipliers 106 to 108 by IPN to output spread channel data. This twisted quadrature spreading is characteristic of the present invention.

In the present invention, the information signal of the first channel (i.e., pilot channel data PD) is spread differently from those of next channels (i.e., user channel data UD1 and UD2). By contrast, the I-arm information signal of each channel is spread by the I-arm PN code, and the Q-arm information signal thereof is spread by the Q-arm PN code, in the contemporary practice. In the present invention, the I-arm and Q-arm data of the pilot channel data PD is spread by the I-arm PN code and Q-arm PN code, respectively, as in the conventional technology. But, the user channel data UD1 and UD2 are spread by crossly providing the I-arm and Q-arm PN codes. That is, the Q-arm PN code is provided to the I-arm data, and the I-arm PN code to the Q-arm data.

Meanwhile, the I-arm and Q-arm PN codes are crossly provided for second, third, and last channels, user channels #1, #2, and #N in FIG. 2. Yet, it should be noted that preferably, all user channel data is spread by cross provision of the I-arm and Q-arm PN codes when N is large but the I-arm and Q-arm PN codes are directly provided for a predetermined number of user channels and crossly provided for another predetermined number of user channels.

For example, assuming that the number of user channels N is 5, the PN codes are directly provided for the pilot channel and a user channel #3 but they are crossly provided for user channels #1, #2, #4, and #5. That is, the PN codes are directly provided to spread information signals of the first few channels and crossly provided for a predetermined number of following channels in the DS-CDMA communication system supporting a plurality of information signal channels according to the present invention. The PN codes alternate between direct provision and cross provision.

Referring to FIG. 2 again, the outputs of the I-arm multipliers 111 to 114 and the Q-arm multipliers 115 to 118 are filtered by the I-arm FIR filters 119 to 122 and the Q-arm FIR filters 123 to 126, respectively. The outputs of the I-arm FIR filters 119 to 122 are added by the adder 127 into the I-arm spread signal IS, and the outputs of the Q-arm FIR filters 123 to 126 are added by the adder 128 into the Q-arm spread signal QS. The I-arm and Q-arm spread signals are low-pass filtered in the LPFs 129 and 30 and applied to the multipliers 131 and 132, respectively. The I-arm multiplier 131 multiplies the I-arm spread signal IS by the in-phase component $\cos(2\pi fct)$ of a carrier and outputs an I-arm modulated signal, and the Q-arm multiplier 132 multiplies the Q-arm spread signal QS by the quadrature-phase component $\sin(2\pi fct)$ and outputs a Q-arm modulated signal. The I-arm and Q-arm modulated signals are added by the adder 133 and band-pass filtered by the BPF 134. The band-pass filtered signal is power-amplified in the AMP 135 and transmitted through air as a radio frequency (RF) signal through the antenna 136.

Figure 5A:
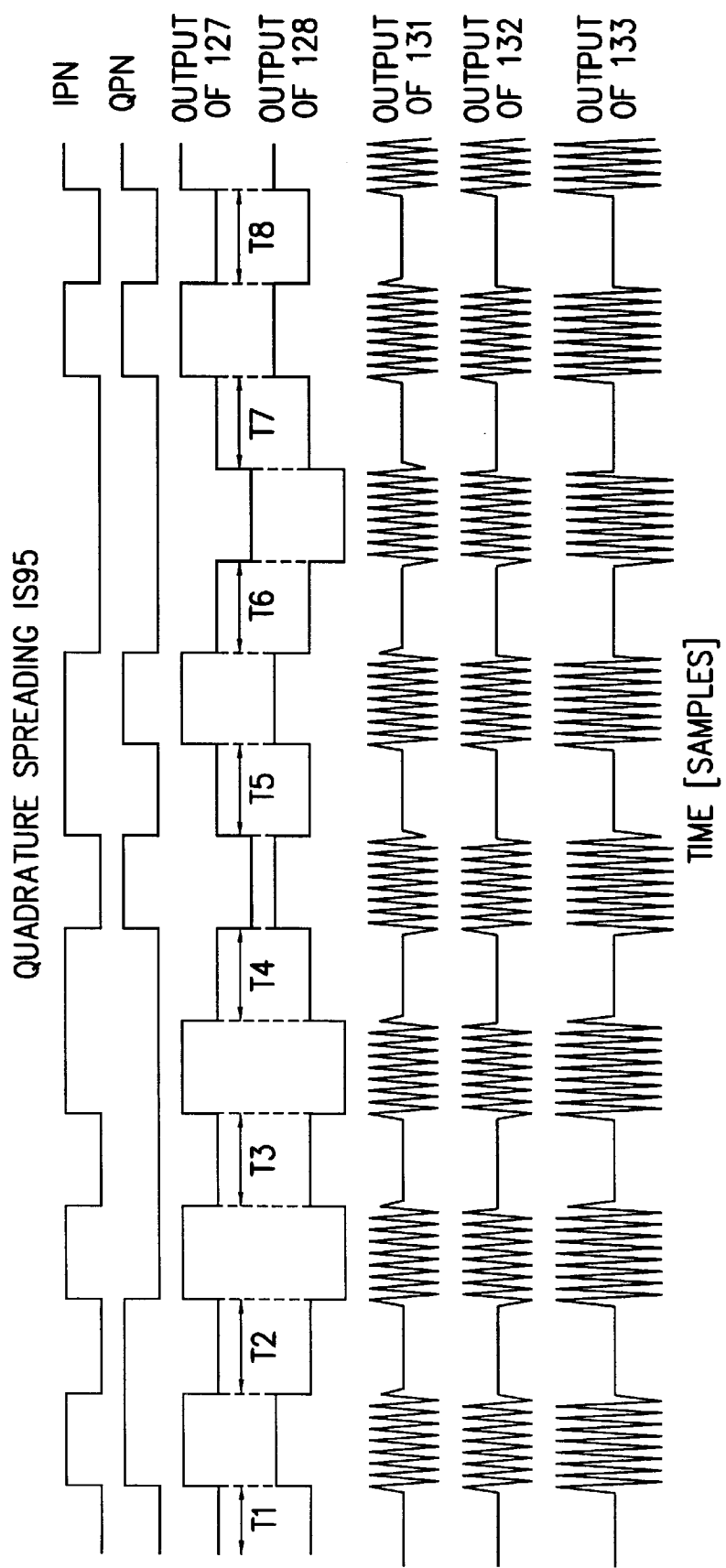
FIGS. 5A and 5B illustrate the spread spectrum signal processing of a typical data transmitter and a data transmitter of the preferred embodiment of the present invention.
Figure 5B:
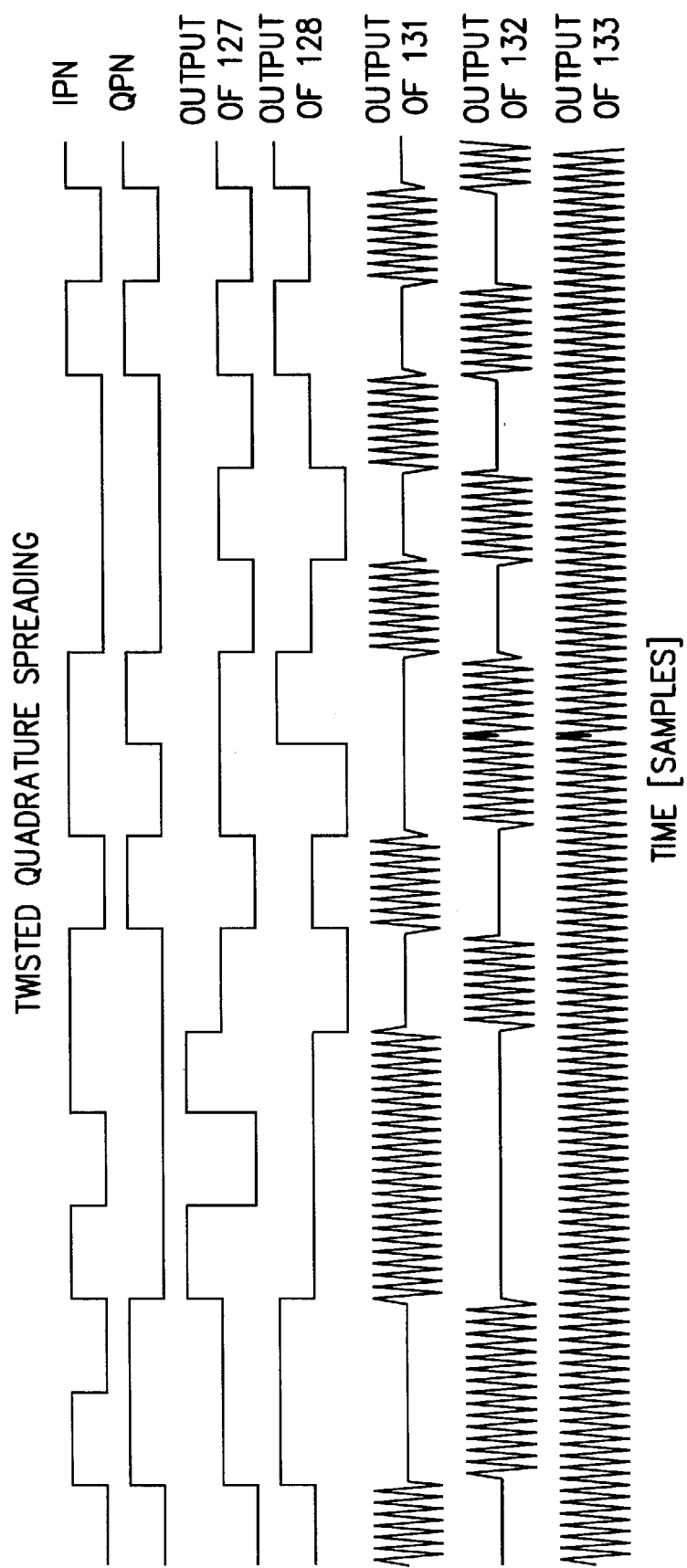

FIGS. 5A and 5B illustrate the spread spectrum signal processing of a typical data transmitter and a data transmitter of the preferred embodiment of the present invention. As shown in FIG. 5A, the outputs of the adders 127 and 128 of the typical transmitter as shown in FIG. 1 are simultaneously zeroes in some periods according to patterns of the channel data and PN codes IPN and QPN. In contrast to the typical data transmitter, there are no periods concurrently having zeroes as the outputs of the adders 127 and 128 with the same PN codes IPN and QPN as shown in FIG. 5B, in the transmitter of a DS-CDMA system according to the present invention. Thus, the addition of the I-arm spread signal IS and the Q-arm spread signal QS does not result in zero, thereby preventing on-off keying modulation in the transmitter and relieving the constraint of using the high linearity amplifier as the AMP 135. Moreover, the absence of on-off keying in the data transmitter permits the receiver to facilitate recovery of data and a clock signal and ensure PN synchronization, thereby increasing system performance.

Figure 3:
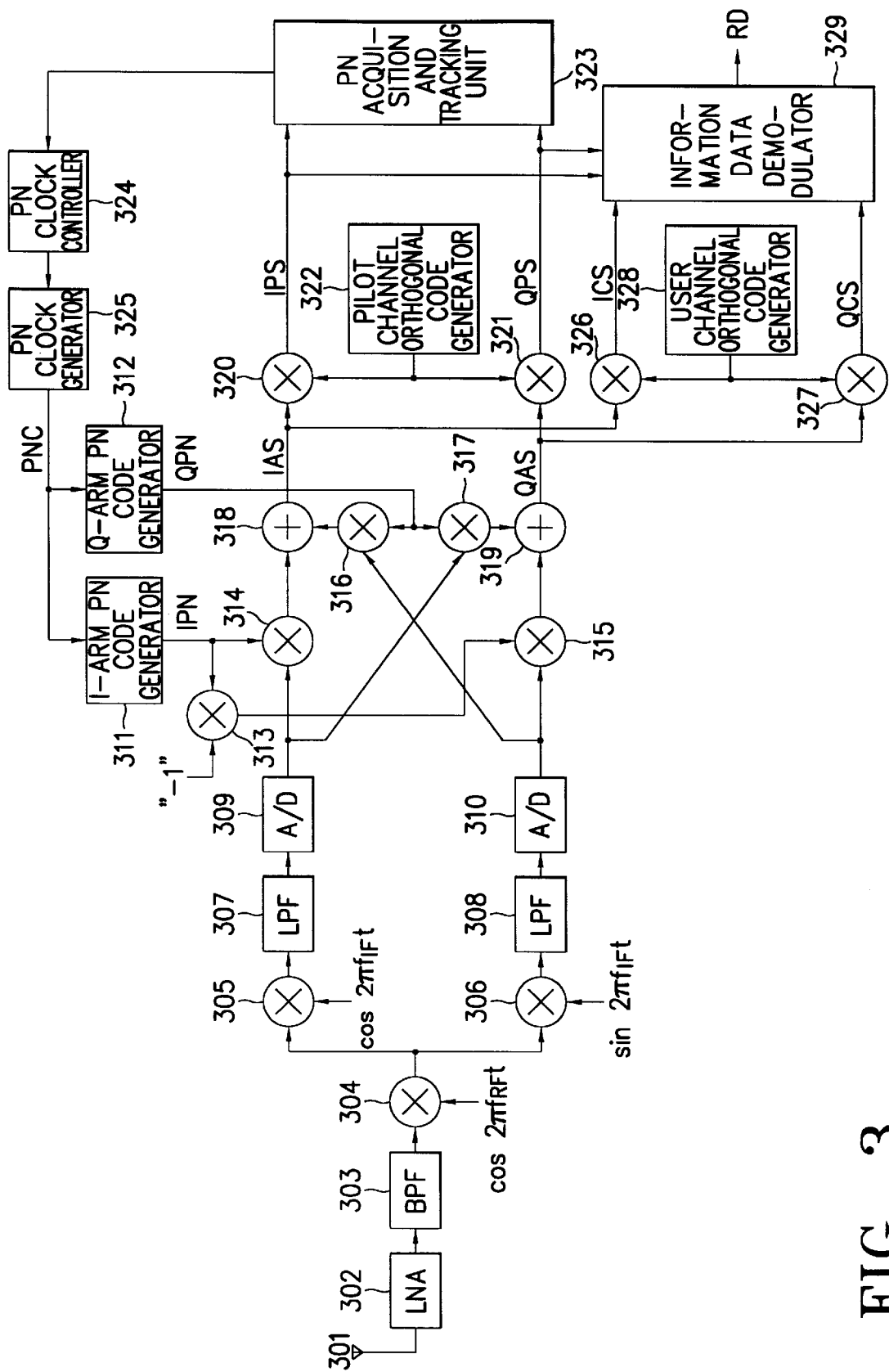
FIG. 3 is a block diagram of a data receiver in a DS-CDMA communication system constructed according to a preferred embodiment of the present invention.

FIG. 3 illustrates a data receiver of a DS-CDMA communication system according to a preferred embodiment of the present invention. The receiver is designed in correspondence with the transmitter shown in FIG. 2. More specifically, the receiver provides the I-arm and Q-arm PN codes for I-arm data and inverted I-arm and Q-arm PN codes for Q-arm data for despreading a spread signal, because the transmitter of the present invention generates a spread signal by providing the inverted Q-arm PN code for the I-arm data and the I-arm PN code for the Q-arm data.

Referring to FIG. 3, a radio frequency (RF) signal received via an antenna 301 is low-noise amplified by a low-noise amplifier 302, band-pass filtered by a BPF 303, and multiplied by a receiving local oscillation frequency $\cos(2\pi f_{RF}t)$ in a multiplier 304. The multiplied result output from the multiplier 304 being an intermediate frequency signal is separated into I-arm data and Q-arm data. The I-arm data is multiplied by the in-phase component $\cos(2\pi f_{IF}t)$ of the intermediate frequency in a multiplier 305 and the Q-arm data is multiplied by the quadrature-phase component $\sin(2\pi f_{IF}t)$ thereof in a multiplier 306. The multipliers 305 and 306 output I-arm and Q-arm analog baseband spread signals free of carrier components, respectively. The outputs of the multipliers 305 and 306 are low-pass filtered by LPFs 307 and 308, respectively, and converted to I-arm and Q-arm digital spread signals in analog-to-digital converts (ADCs) 309 and 310, which are baseband spread signals and will be despread by PN codes as follows.

I-arm data of the I-arm digital baseband spread signal is multiplied by the output IPN of an I-arm PN code generator 311 in a multiplier 314, and Q-arm data thereof is multiplied by an output QPN of a Q-arm PN code generator 312 in a multiplier 317. I-arm data of the Q-arm digital baseband spread signal is multiplied in a multiplier 315 by an output of a multiplier 313, that is, an inverted I-arm PN code, resulting from multiplication of the I-arm PN code IPN by −1, and Q-arm data thereof is multiplied by the I-arm PN code IPN in a multiplier 316. To obtain a PN component-free I-arm despread signal, the outputs of the multipliers 314 and 316 are added by an adder 318, and to obtain a PN component-free Q-arm despread signal, the outputs of the multipliers 315 and 317 are added by an adder 319. The adders 318 and 319 output PN component-free I-arm and Q-arm despread signals IAS and QAS still having quadrature components, respectively. The quadrature components are removed as follows.

A pilot channel orthogonal code generator 322 and multipliers 320 and 321 are used to remove a quadrature component from a pilot channel. In other words, the multiplier 320 multiplies the I-arm despread signal IAS by an orthogonal code generated from the pilot channel orthogonal code generator 322 and outputs an I-arm pilot signal IPS. The multiplier 321 multiplies the Q-arm despread signal QAS by the orthogonal code and outputs a Q-arm pilot channel signal QPS. The pilot channel orthogonal code generator 322 generates an identical orthogonal code to that of the pilot channel orthogonal code generator 101 of FIG. 2.

The I-arm and Q-arm pilot signals IPS and QPS free of PN code components and quadrature code components are applied to a PN acquisition and tracking unit 323 to enure PN synchronization. A PN clock controller 324 controls the operation of a PN clock generator 325 by the output received from the PN acquisition and tracking unit 323. The PN clock generator 325 generates a control signal PNC to make transmitted and received PN codes in phase, and then the I-arm and Q-arm PN code generators 311 and 312 generate PN codes at a rate determined by the control signal PNC.

The transmitted and received PN codes are in phase by the PN acquisition and tracking unit 323, the PN clock controller 324, the PN clock generator 325, the I-arm PN code generator 311, and the Q-arm PN code generator 312. This is a PN acquisition and PN tracking operation, which is very important to a spread spectrum communication system. Demodulation of actually transmitted information data follows the PN acquisition and PN tracking.

Quadrature components should be removed from the I-arm and Q-arm despread signals free of PN signal components, IAS and QAS prior to demodulation of user data, for example, data of an Nth user channel. An orthogonal code of the Nth channel is generated in a user channel orthogonal code generator 328 and multiplied by the I-arm and Q-arm despread signals IAS and QAS in the multipliers 326 and 327, respectively, into user information signals ICS and QCS of the Nth channel, free of the quadrature components. A demodulator 329 recovers information data, using the I-arm pilot signal IPS, the user information signal ICS, the Q-arm pilot signal QPS, and the user information signal QCS.

Figure 4:
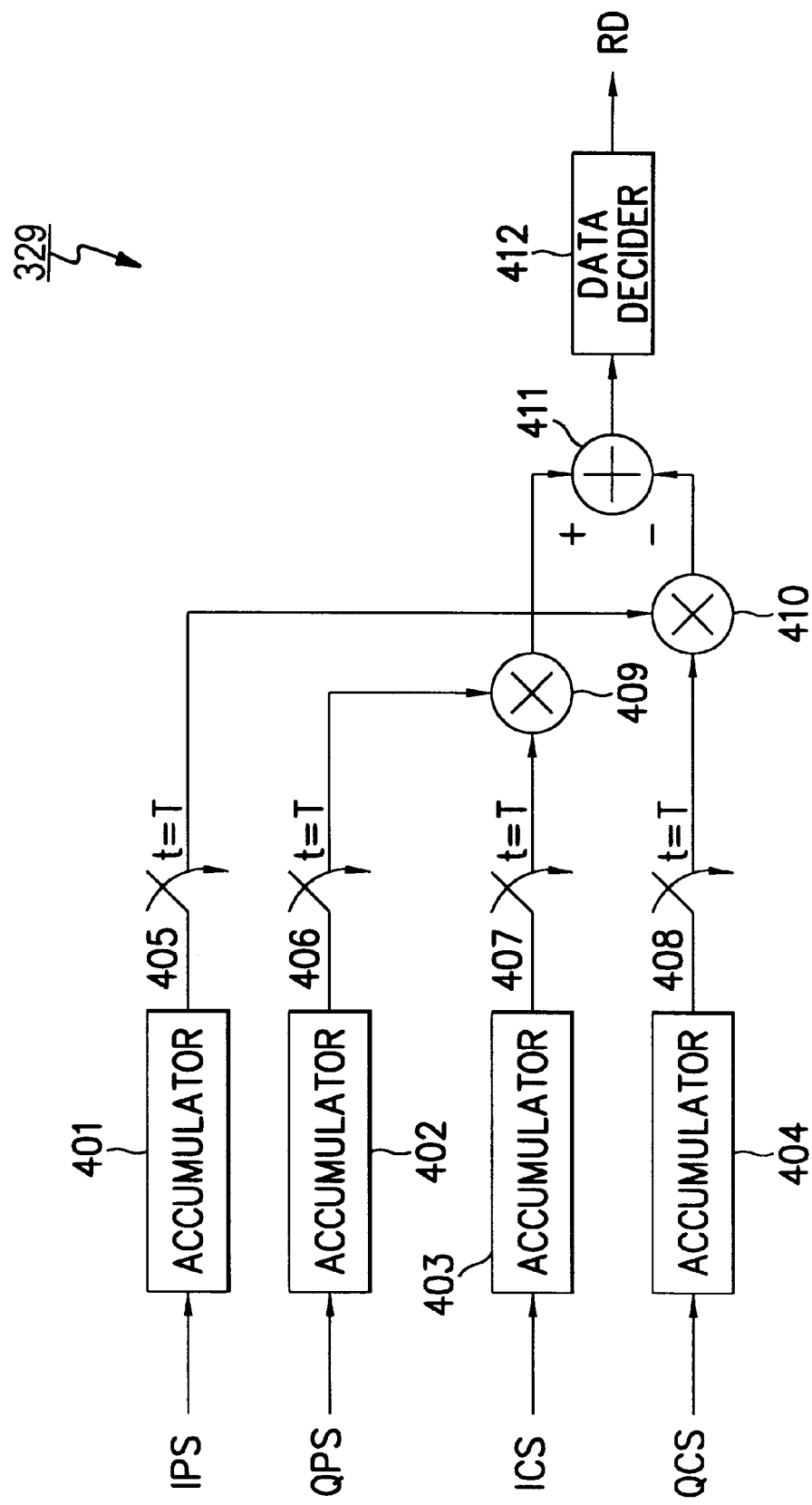
FIG. 4 is a detailed block diagram of a data demodulator shown in FIG. 3.

FIG. 4 is a detailed block diagram of the sync data demodulator 329 of the data receiver as shown in FIG. 3. As shown in FIG. 4, the I-arm and Q-arm pilot signals IPS and QPS are accumulated in accumulators 401 and 402, respectively. The I-arm and Q-arm user information signals ICS and QCS are accumulated in accumulators 403 and 404, respectively. The pilot and user channel signals accumulated in the accumulators 401 to 404 are dumped by dumpers 405 to 408 at a time point when each symbol duration t is T. To optimize the performance of the system, the dumping cycle of the user channel dumpers 407 and 408 should be identical to the symbol duration t of t being T. But, t≧T for the dumping cycle of the pilot channel dumpers 405 and 406.

The output of the Q-arm pilot channel dumper 406 is multiplied in a multiplier 409 by that of the I-arm user channel dumper 407, and the output of the I-arm pilot channel dumper 405 is multiplied in a multiplier 410 by that of the Q-arm user channel dumper 408. The difference between the outputs of the multipliers 409 and 410 is calculated in a subtracter 411 to obtain the phase difference between the pilot channel and the user channel. A data decider 412 recovers data by the output of the subtracter 411 by hard decision or soft decision. For hard decision, the data decider 412 recovers the data as "0" when the output of the subtracter 411 is not smaller than 0, and as "1" when the output thereof is smaller than 0. For soft decision, a Viterbi decoder is used for the data decider 412.

As described above, the present invention employs a twisted spreading control scheme in which I-arm and Q-arm PN codes are crossly provided to I-arm data and Q-arm data. Thus, I-arm and Q-arm spread signals are not simultaneously zeroes to thereby prevent on-off of an information signal and a serious amplitude shift. Another advantage of the present invention is to facilitate recovery of data and a clock signal in a receiver and thus increase the performance of the receiver. Furthermore, there is no need for a high linearity power amplifier in a transmitter.

While there have been illustrated and described what are considered to be preferred embodiments of the present invention, it will be understood by those skilled in the art that various changes and modifications may be made, and equivalents may be substituted for elements thereof without departing from the true scope of the present invention. For example, though with the first channel as a pilot channel and the other channels as user ones, PN codes and are directly provided for the first channel and crossly provided for a few following user channels in the embodiments, the first channel may be a user channel. Therefore, it is intended that the present invention not be limited to the particular embodiment disclosed as the best mode contemplated for carrying out the present invention, but that the present invention includes all embodiments falling within the scope of the appended claims.

What is claimed is:

1. A spread signal generating device in a spread spectrum communication system for transmitting an information signal through a plurality of channels, comprising:
    means for generating I-arm and Q-arm pseudo-random noise codes, and an inverted Q-arm pseudo-random noise code;
    a first multiplier for multiplying an information signal of a first channel among a plurality of channels by the I-arm pseudo-random noise code;
    a second multiplier for multiplying the information signal of the first channel by the Q-arm pseudo-random noise code;
    a first plurality of multipliers for respectively multiplying information signals of other channels by the inverted Q-arm pseudo-random noise code;
    a second plurality of multipliers for respectively multiplying the information signals of other channels by the I-arm pseudo-random noise code;
    a first adder for adding the multiplication results of the first multiplier and the first plurality of multipliers to produce an I-arm spread spectrum signal; and
    a second adder for adding the multiplication results of the second multiplier and the second plurality of multipliers to produce a Q-arm spread spectrum signal.

2. The spread signal generating device of claim 1, wherein the information signal of the first channel corresponds to a pilot channel signal.

3. The spread signal generating device of claim 1, wherein the information signals of the other channels correspond to user channel signals respectively.

4. The spread signal generating device of claim 3, wherein the number of the other channels is two.

5. The spread signal generating device of claim 1, further comprising Finite Impulse Response filters arranged between the multipliers and the adders to filter the outputs of the respective multipliers and produce filtered signals to the adders.

6. The spread signal generating device of claim 1, further comprised of said pseudo-random noise code generating means comprising:
    an I-arm pseudo-random noise code generator for generating said I-arm pseudo-random noise code;
    a Q-arm pseudo-random noise code generator for generating said Q-arm pseudo-random noise code; and
    an inverter for inverting said Q-arm pseudo-random noise code to produce said inverted Q-arm pseudo-random noise code.

7. A transmitter in a Direct-Sequence Code Division Multiple Access communication system, comprising:
    a pilot channel encoder for multiplying pilot channel data by a predetermined pilot channel orthogonal code and outputting encoded pilot channel data;
    a user channel encoder for multiplying a plurality of user channel data by a plurality of user channel orthogonal codes, each orthogonal to an adjacent code, and outputting a plurality of encoded user channel data;
    a pseudo-random noise generator for generating an I-arm pseudo-random noise code and a Q-arm pseudo-random noise code;
    a pilot channel spreader for multiplying the encoded pilot channel data by the I-arm pseudo-random noise code and the Q-arm pseudo-random noise code, respectively, and outputting I-arm and Q-arm spread pilot channel data;
    a user channel spreader for multiplying the plurality of encoded user channel data by an inverted Q-arm pseudo-random noise code and the I-arm pseudo-random noise code, respectively, and outputting a plurality of I-arm spread user channel data and a plurality of Q-arm spread user channel data;
    a first adder for adding the I-arm spread pilot channel data and the plurality of I-arm spread user channel data to produce I-arm spread data;
    a second adder for adding the Q-arm spread pilot channel data and the plurality of Q-arm spread user channel data to produce Q-arm spread data;
    a first modulator for multiplying the I-arm spread data by an in-phase component of a predetermined carrier to produce an I-arm modulated signal;
    a second modulator for multiplying the Q-arm spread data by a quadrature-phase component of the predetermined carrier to produce a Q-arm modulated signal;
    a third adder for adding the I-arm modulated signal and the Q-arm modulated signal;
    a band pass filter for band-pass filtering the output of the third adder; and
    an amplifier for power-amplifying the output of the band pass filter and outputting a radio frequency signal for transmission via a communication channel.

8. The transmitter of claim 7, further comprising an inverter for multiplying the Q-arm pseudo-random noise code by −1 to produce a multiplied result as the inverted Q-arm pseudo-random noise code to the user channel spreader.

9. The transmitter of claim 8, further comprised of said user channel spreader comprising:
    a first group of multipliers for multiplying each of the plurality of encoded user channel data by the inverted Q-arm pseudo-random noise code; and
    a second group of multipliers for multiplying each of the plurality of encoded user channel data by the I-arm pseudo-random noise code.

10. The transmitter of claim 9, further comprised of said pilot channel spreader comprising:
    a first multiplier for multiplying the encoded pilot channel data by the I-arm pseudo-random noise code to produce the I-arm spread pilot channel data; and a second multiplier for multiplying the encoded pilot channel data by the Q-arm pseudo-random noise code to produce the Q-arm spread pilot channel data.

11. The transmitter of claim 10, further comprising a plurality of Finite Impulse Response filters, each disposed between the first adder and each of the first multiplier and the first group of multipliers and between the second adder and each of the second multiplier and the second group of multipliers, to filter the I-arm and Q-arm spread pilot channel data and the plurality of I-arm and Q-arm spread user channel data, for the respective channels.

12. The transmitter of claim 10, further comprising:
a first low pass filter between the first adder and the first modulator, for low-pass filtering the I-arm spread data and outputting filtered data to the first modulator; and
a second low pass filter between the second adder and the second modulator, for low-pass filtering the Q-arm spread data and outputting filtered data to the second modulator.

13. A transmitter in a spread spectrum communication system using a pilot channel, comprising:
means for generating first and second pseudo-random noise codes and an inverted second pseudo-random noise code;
a first band spreader for band spreading a modulated pilot channel signal with each of the first pseudo-random noise code and the second pseudo-random noise code to produce band spreaded in-phase and quadrature-phase pilot channel signals;
a second band spreader for band spreading modulated information signals of multiple user channels with each of the first pseudo-random noise code and the inverted second pseudo-random noise code to produce band spreaded in-phase and quadrature-phase information signals of said multiple user channels; and
means for combining the band spreaded in-phase pilot channel signal and the band spread in-phase information signals of said multiple user channels, and combining the band spreaded quadrature-phase pilot channel signal and the band spreaded quadrature-phase information signals of said multiple user channels so as to generate a spread spectrum signal comprising in-phase and a quadrature-phase components for transmission via a communication channel.

14. The transmitter of claim 13, further comprised of said pseudo-random noise code generating means comprising:
a first pseudo-random noise generator for generating said first pseudo-random noise code for in-phase band spreading of said modulated pilot channel signal and said information signals of said multiple user channels;
a second pseudo-random noise generator for generating said second pseudo-random noise code for quadrature-phase band spreading of said modulated pilot channel signal and said information signals of said multiple user channels; and
an inverter for inverting said second pseudo-random noise code to produce said inverted second pseudo-random noise code.

15. The transmitter of claim 13, further comprised of said first band spreader comprising:
a first multiplier for multiplying said modulated pilot channel signal by the first pseudo-random noise code to produce a band spreaded in-phase pilot channel signal;
a second multiplier for multiplying the information signal of the first channel by the Q-arm pseudo-random noise code to produce a band spreaded quadrature-phase pilot channel signal.

16. The transmitter of claim 13, further comprised of said second band spreader comprising:
a first plurality of multipliers for respectively multiplying said modulated information signals of said multiple user channels by the inverted second pseudo-random noise code to produce band spreaded in-phase information signals of said multiple user channels; and
a second plurality of multipliers for respectively multiplying said modulated information signals of said multiple user channels by the first pseudo-random noise code produce band spreaded quadrature-phase information signals of said multiple user channels.

17. The transmitter of claim 14, further comprised of said first band spreader comprising:
a first multiplier for multiplying said modulated pilot channel signal by the first pseudo-random noise code to produce a band spreaded in-phase pilot channel signal;
a second multiplier for multiplying the information signal of the first channel by the Q-arm pseudo-random noise code to produce a band spreaded quadrature-phase pilot channel signal.

18. The transmitter of claim 17, further comprised of said second band spreader comprising:
a first plurality of multipliers for respectively multiplying said modulated information signals of said multiple user channels by the inverted second pseudo-random noise code to produce band spreaded in-phase information signals of said multiple user channels; and
a second plurality of multipliers for respectively multiplying said modulated information signals of said multiple user channels by the first pseudo-random noise code produce band spreaded quadrature-phase information signals of said multiple user channels.

* * * * *